J. H. WATSON.
ROTARY ENGINE.
APPLICATION FILED JULY 12, 1910.

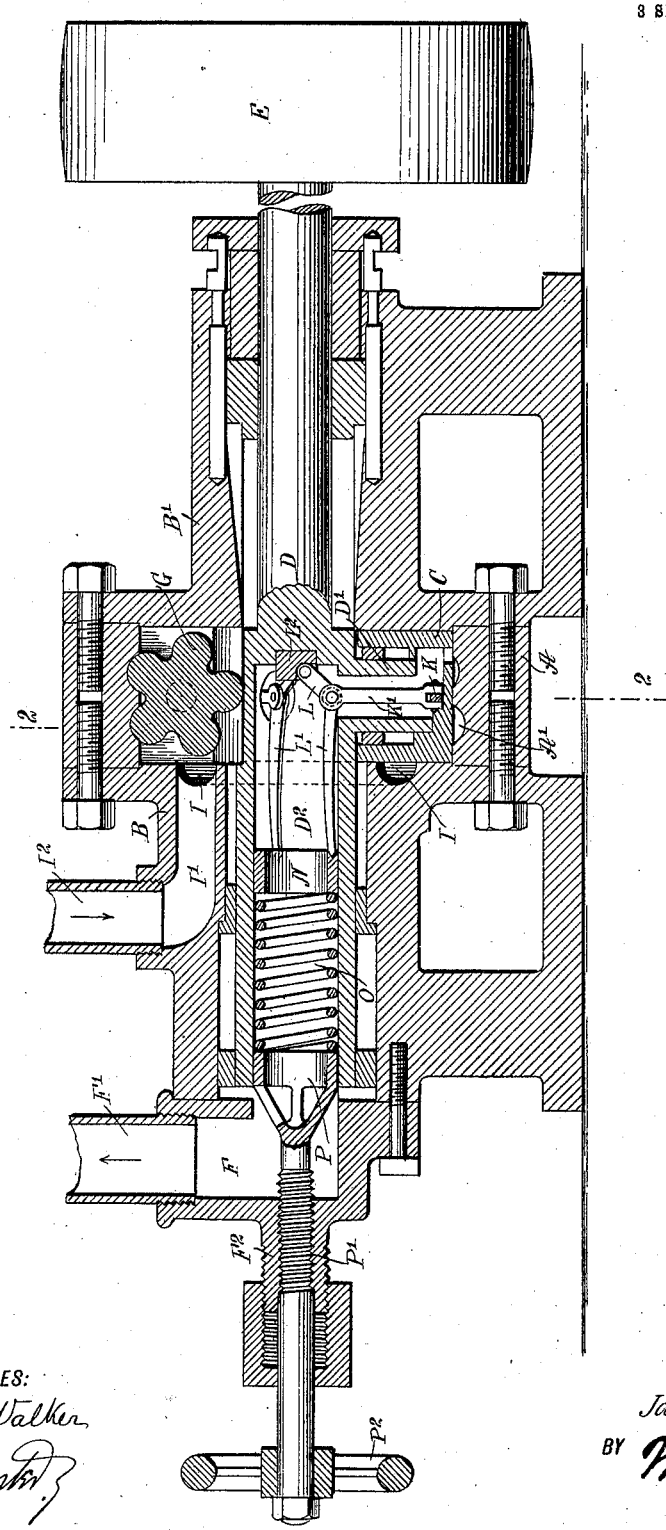

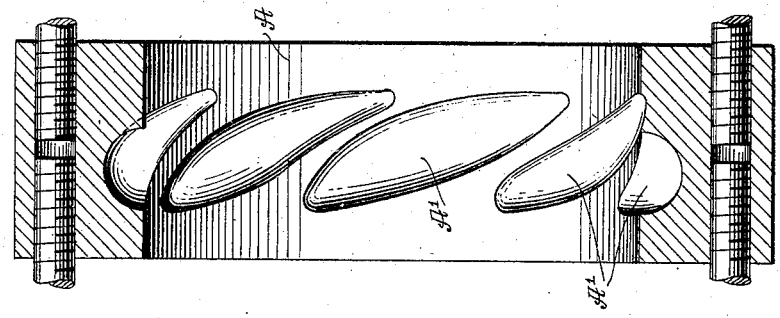
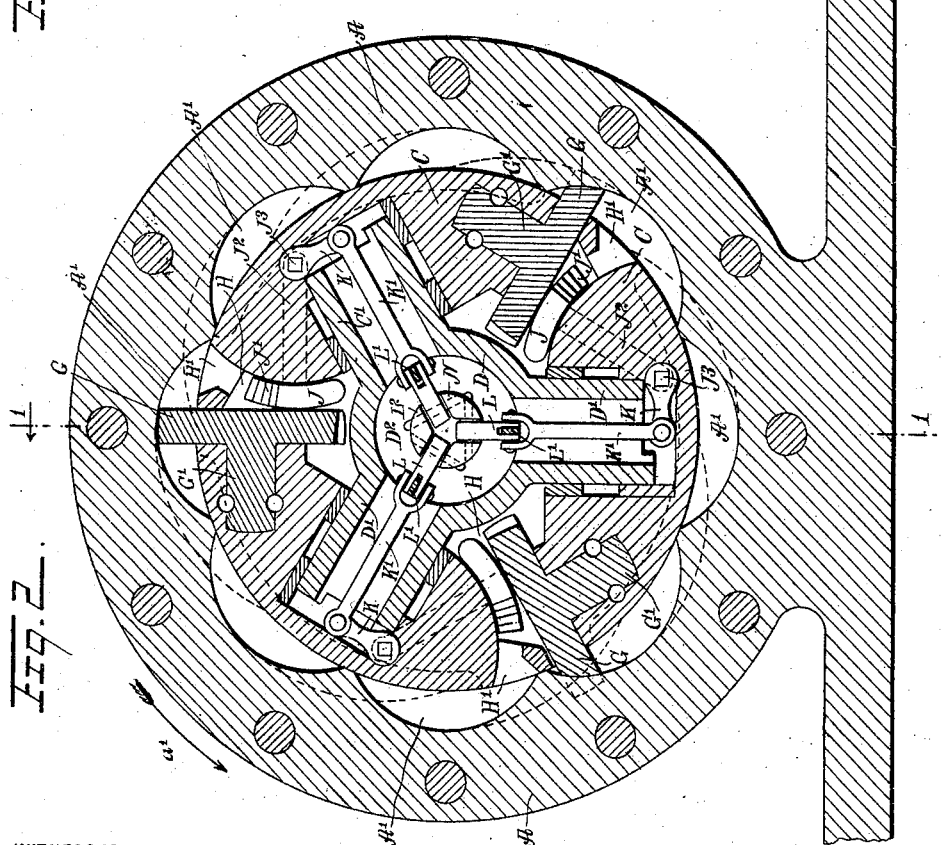

984,983.

Patented Feb. 21, 1911.

3 SHEETS—SHEET 3.

WITNESSES:
H. D. Walker

INVENTOR
James H. Watson
BY
ATTORNEYS

UNITED STATES PATENT OFFICE.

JAMES HENRY WATSON, OF RIVERTON, WYOMING.

ROTARY ENGINE.

984,983.     Specification of Letters Patent.     Patented Feb. 21, 1911.

Application filed July 12, 1910. Serial No. 571,601.

*To all whom it may concern:*

Be it known that I, JAMES H. WATSON, a citizen of the United States, and a resident of Riverton, in the county of Fremont and State of Wyoming, have invented a new and Improved Rotary Engine, of which the following is a full, clear, and exact description.

The object of the invention is to provide a new and improved rotary engine, arranged to utilize the motive agent to the fullest advantage and to properly govern the speed of the engine.

In order to produce the desired result, use is made of a cylinder provided on its inner surface with spirally-arranged cavities for the motive agent to pass in, and a rotor mounted to turn in the said cylinder and having heads in the form of revoluble star wheels in mesh with the said cavities.

A practical embodiment of the invention is represented in the accompanying drawings forming a part of this specification, in which similar characters of reference indicate corresponding parts in all the views.

Figure 4:
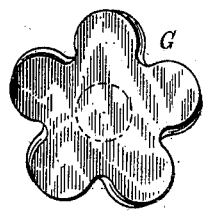
Figure 5:
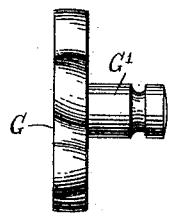
Figure 6:
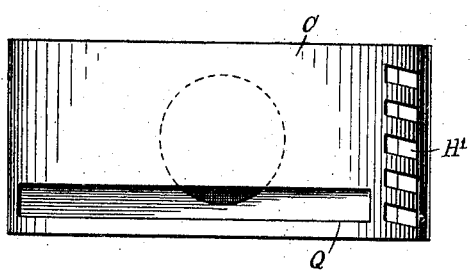
Figure 7:
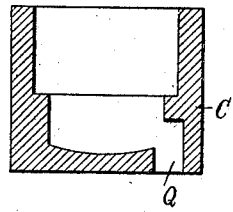
Figure 8:
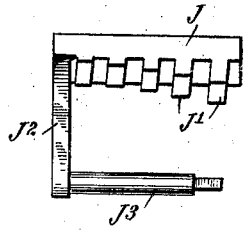

Figure 1 is a longitudinal section of the rotary engine, the section being on the line 1—1 of Fig. 2; Fig. 2 is an enlarged transverse section of the same on the line 2—2 of Fig. 1; Fig. 3 is an enlarged sectional side elevation of the cylinder; Fig. 4 is a face view of one of the rotary heads of the rotor; Fig. 5 is an edge view of the same; Fig. 6 is a plan view of one of the rotor sections; Fig. 7 is a sectional elevation of the same; and Fig. 8 is a face view of one of the admission valves.

The cylinder A of the rotary engine is provided with cylinder heads B, B', and in the said cylinder A is mounted to turn a rotor C, preferably made in sections attached to the hollow arms D' of the engine shaft D, journaled in the heads B, B', and provided at one outer end with a fly wheel or a pulley E, for transmitting the rotary motion of the engine to other machinery. The other end D² of the shaft D is made hollow, and connected with the hollow arms D' to form a passage for the exhaust motive agent, the terminal of the hollow shaft end D², leading to an exhaust chamber F, attached to the outer end of the cylinder head B, and provided with an exhaust pipe F'.

The interior surface of the cylinder A is provided with spirally-arranged cavities A', widest at the middle and narrowing at the ends, the cavities overlapping each other, as plainly indicated in Fig. 3. In meshing contact with the cavities A' are rotor heads G, in the form of star wheels, disposed radially relative to the rotor C, and the said rotor heads G have their shafts G' journaled in the rotor C, as plainly indicated in Fig. 2. The teeth of the rotor heads G have spiral faces (see Figs. 4 and 5), corresponding and fitting into the cavities A' in the cylinder A, so that when the rotor is rotated in the direction of the arrow $a'$ (see Fig. 2), then the rotor heads G advance in the cavities A' and are rotated by meshing contact with the same.

In the rotor C in the rear of the rotor heads G are formed admission chambers H having ports H' leading to the peripheral face of the rotor C, to supply the cavities A' with live motive agent, and the said chambers H are connected with an annular groove I, formed in the cylinder head B and leading to a channel I' extending lengthwise in the cylinder head B, and connected with a supply pipe I² connected with a boiler or other motive agent supply. Each of the admission ports H' is in the form of a series of apertures (see Fig. 6), adapted to be opened and closed by the graduated lugs J' of an admission valve J, controlling the passage of the live motive agent from the chambers H to the cavities A' of the cylinder A. Each admission valve J is provided at one end with an arm J² attached to a shaft or a pivot J³, journaled in the rotor C, and on the shaft J³ is secured an arm K connected with a link K' extending through the corresponding hollow arm D' of the engine shaft D. The inner end of each link K' is pivotally connected with toggle levers L, L', of which the toggle lever L is fulcrumed on a block L² attached centrally to the solid portion of the shaft D, as plainly indicated in Fig. 1, and the free end of the other toggle lever L' bears against a tubular cross head N, mounted to slide in the hollow shaft end D². A spring O coiled in the hollow shaft end D² presses against the cross head N in an inward direction, and the outer end of the spring O abuts against a hollow head P opening into the exhaust chamber F and attached to a screw rod P' screwing in a boss F² forming part of the exhaust chamber F.

A handle or a hand wheel P² is secured to the outer end of the screw rod P', to permit the operator to screw the screw rod P' inward or outward, to increase or decrease the tension of the spring O and thus cause the cross head N to exert more or less pressure against the toggle levers L'. Now by the arrangement described, the admission valves J are normally held in an open position relative to the admission ports H' by the action of the spring O on the cross head N, toggle levers L, L', links K' and arms K attached to the shafts J³ of the admission valves J. When the engine, however, is rotating in the direction of the arrow $a'$, then the admission valves J swing outward by centrifugal force, and in doing so their lugs J' pass into the corresponding apertures of the admission ports H', to gradually close the same and thus govern the admission of the motive agent to the cavities A'.

It is understood that by graduating the lugs J' of the admission valves J, the apertures of each admission port H' are gradually closed or opened, and hence the admission of the motive agent is graduated according to the speed of the engine.

Each of the sections of the rotor C is provided on its peripheral face with an exhaust groove Q, opening into the corresponding hollow arm D', the groove terminating at one end adjacent to the corresponding admission port H' and at the other end near the rotor head G mounted in this particular section of the rotor C.

The operation is as follows: When the several parts are in the position illustrated in the drawings and the engine is running and the rotor C rotates in the direction of the arrow $a'$, then the live motive agent passes by way of the annular groove I into the admission chambers H and by way of the admission ports H' into the cavities A' in the rear of the teeth of the rotor heads G, so as to exert pressure against the said rotor heads to rotate the rotor C in the direction of the arrow $a'$. As the teeth of the rotor heads G advance in the cavities A', the rotor heads G are turned and consequently the next following tooth of a rotor head passes into the next following cavity A', and when the tooth of a rotor head G nears the end of a cavity, the exhaust groove Q connects with the rear end of this cavity, to allow the motive agent to pass out of the cavity into the corresponding hollow arm D', and to pass from the latter by way of the hollow shaft end D² into the exhaust chamber F and to the exhaust pipe F'.

It is understood that when one of the cavities A' is connected with the exhaust groove Q, then the next following cavity is about half filled with the motive agent, and when the rotor head G has advanced one-ninth of a revolution more, the first cavity is half exhausted while the second cavity is just ready to exhaust and the third one is half filled with steam, and so on through the whole revolution of the rotor C, to cause the rotor C to turn in the direction of the arrow $a'$. It will further be noticed that when the speed of the rotor C increases beyond a normal rate of speed, then the centrifugal admission valves J swing outward by centrifugal force and throttle the admission ports H' until the speed of the rotor C is reduced to normal speed, and when this takes place, the valves J have returned to their normal position by the action of the spring pressure device governed by the spring O.

Having thus described my invention, I claim as new and desire to secure by Letters Patent:

1. A rotary engine, comprising a cylinder, provided on its inner surface with spiral cavities, and a rotor in the said cylinder and having heads in the form of rotary star wheels in meshing contact with the said cavities, the said rotor having means for controlling the admission of the motive agent to the said cavities.

2. A rotary engine, comprising a cylinder provided at its inner surface with spiral overlapping cavities, a rotor within the said cylinder and having admission ports leading to the said cavities and connected with a motive agent supply, revoluble heads on the said rotor and in engagement with the cavities, and centrifugal valves for controlling the said ports.

3. A rotary engine, comprising a cylinder, provided at its inner surface with spiral overlapping cavities, a rotor within the said cylinder and having admission ports leading to the said cavities and connected with a motive agent supply, revoluble heads on the said rotor and in engagement with the cavities, centrifugal valves for controlling the said ports, and a spring pressure device connected with the said valves to normally hold the same open.

4. A rotary engine, comprising a cylinder provided at its inner surface with overlapping spiral cavities, a rotor within the said cylinder and having admission ports for supplying the cavities with live motive agent, the said admission ports being connected with a motive agent supply, the said rotor having exhaust ports at its peripheral face and connected with a central exhaust chamber in the rotor, star wheels journaled on the said rotor and in mesh with the inner surface of the cylinder and its cavities, and admission valves mounted on the rotor for controlling the said admission ports.

5. A rotary engine, comprising a cylinder provided at its inner surface with overlapping spiral cavities, a rotor within the said cylinder and having admission ports for supplying the cavities with live motive agent, the said admission ports being connected with a motive agent supply, the said rotor having exhaust ports at its peripheral face and connected with a central exhaust chamber in the rotor, star wheels journaled on the said rotor and in mesh with the inner surface of the cylinder and its cavities, centrifugal admission valves mounted to swing on the said rotor and controlling the admission ports, and a spring pressure device mounted on the rotor and connected with the said admission valves.

6. A rotary engine, comprising a cylinder provided at its inner surface with overlapping spiral cavities, a rotor within the said cylinder and having admission ports for supplying the cavities with live motive agent, the said admission ports being connected with a motive agent supply, the said rotor having exhaust ports at its peripheral face and connected with a central exhaust chamber in the rotor, star wheels journaled on the said rotor and in mesh with the inner surface of the cylinder and its cavities, centrifugal admission valves mounted to swing on the said rotor, arms on the pivots of the said valves, toggle levers fulcrumed on the rotor, links connecting the said toggle levers with the said pivot arms, and a spring-pressed cross head mounted to slide on the said rotor and engaged by the said toggle levers.

7. A rotary engine, comprising a cylinder, provided on its inner surface with overlapping spiral cavities, a rotor within the said cylinder and having admission ports for supplying the cavities with live motive agent, the said admission ports being connected with a motive agent supply, the said rotor having exhaust ports at its peripheral face and connected with a central exhaust chamber in the rotor, star wheels journaled on the said rotor and in mesh with the inner surface of the cylinder and its cavities, and admission valves mounted on the rotor for controlling the said admission ports, each of the admission ports being formed of a plurality of apertures extending across the peripheral face of the rotor, and each admission valve having a plurality of graduated lugs for successively closing or opening the said apertures on rocking the admission valves.

In testimony whereof I have signed my name to this specification in the presence of two subscribing witnesses.

JAMES HENRY WATSON.

Witnesses:
   ISAAC E. FOBES,
   CHARLES SWANSON.